United States Patent
Dixon et al.

[11] 3,914,358
[45] Oct. 21, 1975

[54] METHOD OF IMPROVING THE FINISH OF THE BORES OF A REVERSE OSMOSIS SAND MODULE

[75] Inventors: George D. Dixon, Monroeville; Hugh A. Nelson, Pittsburgh, both of Pa.

[73] Assignee: Westinghouse Electric Corporation, Pittsburgh, Pa.

[22] Filed: Dec. 10, 1973

[21] Appl. No.: 423,641

[52] U.S. Cl. .................. 264/41; 210/490; 210/500; 264/69; 264/113; 264/269; 427/401
[51] Int. Cl.²......................................... B29D 27/04
[58] Field of Search ......... 264/41, 49, 45, 112, 113, 264/269, 69; 210/321, 490, 500; 117/63

[56] References Cited
UNITED STATES PATENTS

| | | | |
|---|---|---|---|
| 3,022,187 | 2/1962 | Lowe Byraud et al. | 55/158 X |
| 3,341,024 | 9/1967 | Lowe et al. | 264/50 X |
| 3,457,170 | 7/1969 | Havens | 264/41 UX |
| 3,505,785 | 4/1970 | Kirkland | 117/63 UX |
| 3,544,358 | 12/1970 | Manjikian | 264/41 X |
| 3,598,241 | 8/1971 | Vondracek | 210/321 |
| 3,610,418 | 10/1971 | Calderwood | 210/321 |
| 3,647,521 | 3/1972 | Tulin | 264/41 UX |
| 3,657,402 | 4/1972 | Stana et al. | 264/45 |
| 3,658,955 | 4/1972 | Chamberlin et al. | 264/269 X |
| 3,773,181 | 11/1973 | Calderwood et al. | 210/490 X |
| 3,791,526 | 2/1974 | Stana et al. | 210/490 X |

*Primary Examiner*—Philip Anderson
*Attorney, Agent, or Firm*—D. P. Cillo

[57] ABSTRACT

A method of making a liquid purification module consists of (1) applying a finishing composition, comprising fine filler particles coated with a resinous material, to the interior circular cular bore walls of a membrane support module made of bonded, resin-coated coarse filler particles, to smooth irregularities in the bore walls, and then (2) drying the finishing composition to harden the finishing composition resinous material and bond it to the bore walls prior to applying semipermeable membranes inthe module bores.

11 Claims, 4 Drawing Figures

METHOD OF IMPROVING THE FINISH OF THE BORES OF A REVERSE OSMOSIS SAND MODULE

BACKGROUND OF THE INVENTION

This invention relates to methods of improving the interior bore finish of porous support modules made of bonded, resin-coated filler particles, and to methods of casting cellulose acetate or other semipermeable membranes in the sealed support modules to provide a reverse osmosis apparatus.

Osmosis occurs when two solutions of different concentrations in the same solvent are separated from one another by a membrane. If the membrane is ideally semipermeable, that is, if is permeable to the solvent and not to the solute, then a flow of solvent occurs from the more dilute into the more concentrated solution. This continues until the two solutions become equal in concentration or until the pressure in the chamber of the more concentrated solution rises to a certain well-defined value. The pressure difference at which no flow occurs is termed the osmotic pressure difference between the two solutions. If a pressure in excess of this osmotic pressure difference is applied to the more concentrated solution, then the solvent can be caused to flow into the more dilute solution. The names "reverse osmosis", "pressure osmosis" and "hyperfiltration" are used to describe this process.

A reverse osmosis system has application in many areas. The areas of greatest present interest are making potable water from brackish or poluted water and cleaning up waste streams. Other applications are taste improvement of potable but objectionable water, softening of municipal waters, water sterilization, and the concentration of food (orange juice, tomato juice, cheese whey, and syrups).

Materials that have been used successfully as reverse osmosis membrane supports have included resin-bonded sand supports, such as those taught in U.S. Pat. Nos. 3,598,241, 3,610,418 and 3,657,402. However, the surface onto which a reverse osmosis membrane is cast, in the resin-bonded sand support is often rough, containing protrusion and small craters. The protrusions are usually single grains of sand rising above the support surface. Such protrusions can extend 60–500 microns from the support surface. The craters can be three or four grain diameters, i.e., 60–2000 microns across and into the support surface.

These surface irregularities can occur because of incorrect packing of the sand during filling the mold used in forming the module, compaction of the sand during curing, or disturbing the bore surface during removal of the rods which are part of the mold and which provide the central bore into which the membrane is cast. In some cases the surface irregularities can be up to 6 inches long and ½ inch wide.

The protruding sand grains can puncture standard cellulose acetate membranes, which are about 7–15 mils (180–380 microns) thick, and especially the more sophisticated, utra thin polyamide or polyphenylester reverse osmosis membranes, which are about 0.08–6 mils (2–150 microns) thick, at normal operating pressures of about 500–2000 psi, when the membrane is cast or otherwise placed on top of these irregularities. Also, cavities may be bridged on casting, and the resulting membrane may collapse when pressure is exerted upon it.

Another problem in the method of making a reverse osmosis module is that a membrane will not form on large areas of surface roughness, sometimes because the membrane casting solution fails to wet the surface, but more often because the porosity of the irregular area is too great to allow film formation. There is a need then for a method of smoothing bore protuberances and filling bore cavities, in reverse osmosis modules made of bonded, resin-coated filler particles, that will not hamper salt rejection or pure water flux.

SUMMARY OF THE INVENTION

The above problems are solved by applying thin coatings of a finishing composition to the resin bonded filler support for the membrane before applying the membrane. The finishing composition will comprise fine filler particles having an average particle size range of between about 0.5–30 microns, coated with a resinous material constituting about 0.5–10 wt. percent of the resin-coated filler particle weight.

Preferably the resin-coated filler particles will be in slurry or paste form with an evaporable liquid. After application to the support surface, the evaporable liquid is removed by drying, and the resinous material in the finishing composition bonds the fine filler particles to the support, filling the cavities and smoothing any protrusions on the support surface.

BRIEF DESCRIPTION OF THE DRAWINGS

For a better understanding of the invention reference may be made to the preferred embodiments, exemplary of the invention, shown in the accompanying drawings, in which.

DESCRIPTION OF THE PREFERRED EMBODIMENTS

Figure 1:
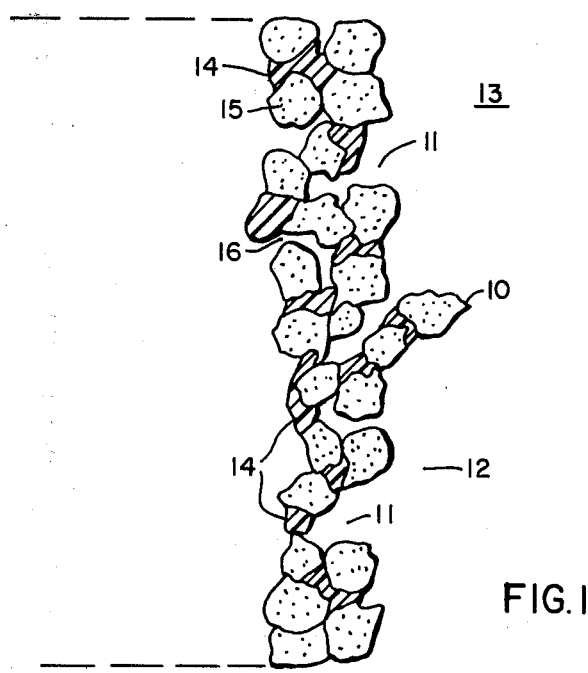
FIG. 1 is a magnified cross-sectional view one bore wall of a porous membrane support apparatus made of resin-bonded filler particles, showing protrusions and cavities in the inside bore wall.

In a typical tubular-type reverse osmosis system, sea water or contaminated feed is pumped through a series of membrane lined support tubes. The pump must exert a pressure greater than the osmotic pressure of the feed and can operate as high as 4,000 psi. They serve to support the reverse osmosis membrane contained on the interior tube wall. The membrane can be made of a cellulose ester or cellulose ether, such as for example, modified cellulose acetate, i.e., aqueous magnesium perchlorate and acetone modified cellulose acetate having an acetyl content of about 39 percent by weight. This type membrane is about 7–15 mils thick and consists of a dense osmotic skin layer supported by a porous spongy layer. Other membranes can include polyamide, polyamide-imide, polyphenylester, polypyrrone, polyacrylic and polysulfonamide membranes. These membranes are about 0.08 to 6 mils thick and generally have a uniform cross section comprising polymer chains having minute interstices therebetween.

The tube walls that support the reverse osmosis membranes must be able to withstand the pressure exerted on them by the pump and must be able to allow egress of the pure water effluent into a final collecting means. For sea water, several stages of this type may be required before the water is usable.

In the fabrication of support tubes or modules made of filler particles, a resin, usually in solution, with an added catalyst, is coated onto the particles in such a way as to leave a thin, dry, uncured film on each filler particle. The resulting particulate composition is free flowing and is cast into a mold of the desired configuration. The mold is then heated to cure the resin. The mold is then cooled and removed. The curing process transforms the filler-resin-catalyst composition into a strong, rigid, open pore tube of bonded, resin-coated filler particles. The tube contains voids or pores between the resin-coated filler particles allowing egress of the pure water which has passed through the reverse osmosis membrane supported by the inside of the tube walls.

On curing, the thin film of resin bonds each filler particle to the adjacent particles. It is readily seen that the type and amount of resin used, the size of the filler particles and the wall thickness can be adjusted to give a considerable range in the strength and porosity of the resultant tube. However, for any given filler-resin tube the strength increases with increasing resin content and the porosity decreases.

Phenolic, epoxy (polyglycidyl ether), polyester and polystyrene resins, among others, can be used as the coating and bonding agent in the bonded, filler particle membrane support.

The filler particles used in the membrane support may be spherical or of irregular configuration. Some examples of suitable filler particles are silica sand, zirconia sand, quartz, or any other filler with a granular structure. The particle size range for the filler particles in the support must be between 40 and 500 microns. Below 40 microns the resin-filler support lacks the desired porosity for low resistance to water flow and above 500 microns the support does not properly support the membrane.

The weight percent resin that can be used will range from 1 to 18 percent of the coated filler particle weight. On a volume basis, the range would be about 4 to 32 percent resin for the fillers enumerated. Above these ranges the resin will tend to clog up the pores between the filler particles in the support causing poor effusion of the pure water. Below these ranges the support will not be strong enough for the pressures required in this type of water purification process.

Referring now to the drawings, FIG. 1 shows, in a magnified cross-section, the protrusions 10 and cavities 11 that may be present in the walls 12 of a membrane support 13, such as the interior bores of a tubular liquid purification module. Also shown in the resin 14 bonding the coarse filler particles 15 together and the passageways 16 allowing water effusion between the generally contacting particles. Not shown are the liquid feed inlet means and purified liquid outlet means associated with the module liquid purification system.

Figure 2:
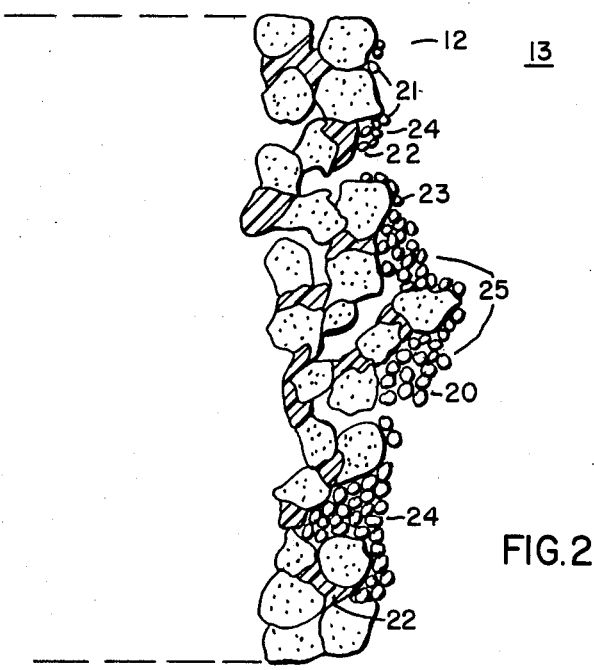
FIG. 2 is a magnified cross-sectional view of the support after application of the finishing composition of this invention, showing the smoothened bore wall surface.

FIG. 2 shows the membrane support 13 after application and drying of the particulate, bonded, finishing composition 20. The hardened resinous component of the finishing composition bonds at points 21 to the thin film of resin on the filler particles that make up the support, and bonds at points 22 to the resin between the filler particles. The coating of the very fine filler particle component 23 of the finishing composition fills in cavities at points 24 and smooths protrusions at points 25.

As is obvious, a membrane cast on the walls of the support shown in FIG. 2 will be better able to wet the surface and form a film, than if cast on the walls of the support shown in FIG. 1, and will be better able to stand reverse osmosis operating pressures against its surface without puncture. The finishing composition does not form a thick layer on the smooth portions of the walls nor does it clog the passageways, but it does selectively fill and smooth wall surface irregularities.

Figure 3:
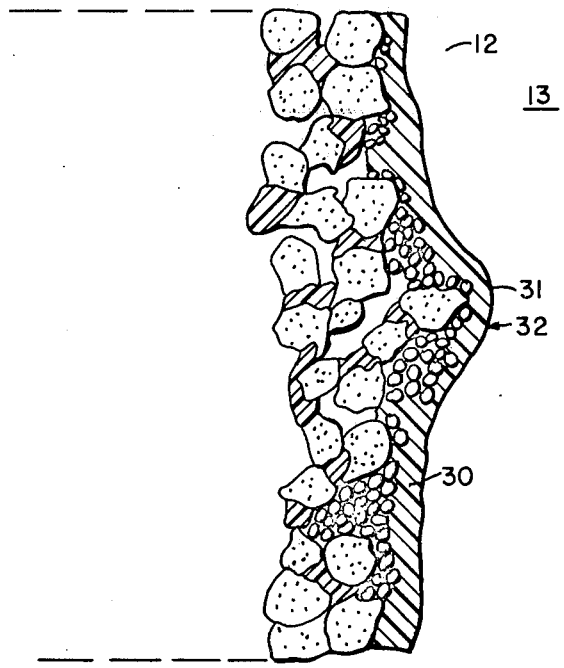
FIG. 3 is a magnified cross-sectional view of the support after application of the finishing composition and casting of a reverse osmosis membrane in place on the smoothened bore wall surface.

As shown in FIG. 3, even a cast in place ultra thin type membrane 30 having a uniform cross section will be able to form a film over sharp protrusions as at point 31. For reference purposes, the protrusion at point 31, shown more clearly as 10 in FIG. 1 was originally about 200 microns or 8 mils, and the ultra thin membrane 30 is about 4 mils thick. Pressure, indicated by the arrow 32, applied against the membrane surface, during liquid purification operation, will cause pure water from the feed liquid to permeate the membrane and finished support without membrane puncture. Even less puncture and film forming problems will be encountered with the generally much thicker and spongier standard cellulose acetate type membranes.

Figure 4:
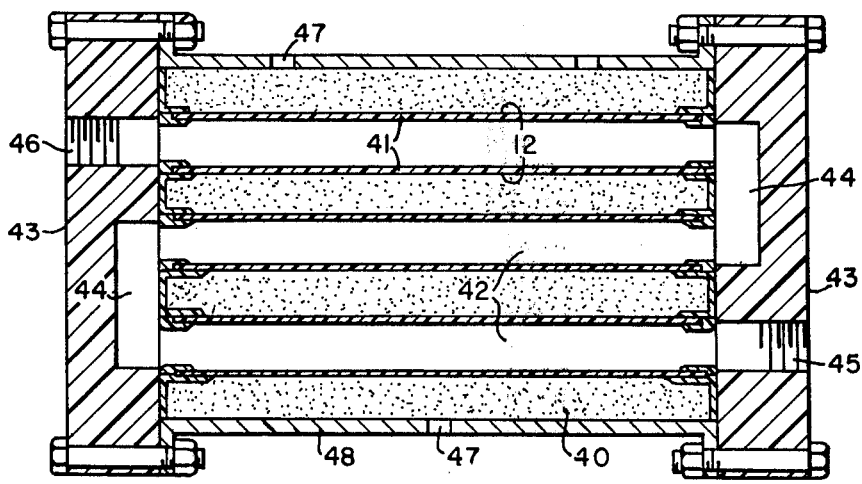
FIG. 4 is a cross-sectional view of a high pressure reverse osmosis apparatus consisting of a supportive, porous module of resin-bonded filler particles having feed inlet means, purified water outlet means and containing reverse osmosis membranes in its axial bores.

FIG. 4 shows the reverse osmosis apparatus made by the method of this invention. It consists of a liquid purification module of resin bonded filler particles 40 containing a plurality of spaced apart feed bores 42 extending from end to end therethrough and tubular reverse osmosis membranes 41 contacting support walls 12. Also shown are end plates 43 having water channels 44, feed entrance 45, feed exit 46, and purified liquid exit holes 47 bored through a metal or other type supporting casing 48 surrounding the module.

The finishing composition of this invention must contain fine filler particles coated with a dryable, preferably heat settable resinous material. The filler particles used may be spherical, oval, cubical, rod like, cylindrical, or of other irregular configuration. Some examples of suitable filler particles are silica sand, zirconia sand, quartz, beryl, talc, glass, calcium silicate or any other filler with a granular or fibrous structure.

The particle size range for the filler particles in the finishing composition must be between 0.5–30 microns. Below 0.5 microns the filler will provide poor porosity for low resistance to water flow, even though the finishing composition is applied as a thin layer at areas of cavities and protrusions in the support surface. Above 30 microns and the finishing composition will not effectively fill cavities and will in fact increase the number of protruberances on the support surface.

The weight percent resinous material that can be used will range from about 0.5 to 10 percent of the dry coated filler particle weight in the finishing composition. On a volume basis the range would be about 2 to 25 percent resin for the fillers enumerated. Above these ranges the resinous material will tend to clog up the pores between the fine filler especially in the support cavity areas, causing poor effusion of the pure water. Below these ranges the finishing composition will not stick properly to the resin coating the filler particles constituting the support surface. The resin content of the finishing composition need not be particularly high, and will preferably range from about 0.5 to 5 weight percent, since the finishing composition is held in place partly by the cast membrane, and since it need not serve as a primary support.

The resinous material, including water insoluble resinous oils, that can be used in the finishing composition include, among others, phenolic, epoxy (polyglycidyl ether), polyester, polystyrene, polyimide, polyamideimide, polysulphone and polyacrylic resins, and vegetable drying type oils such as linseed oil and tung oil. These resinous materials will be mixed with the fine filler particles to provide a thin film on each filler particle. On drying, such as by heating after application, the hardened thin film of resinous material bonds each fine filler particle to the adjacent particles and also bonds the fine filler to the coarse filler constituting the support surface.

The majority of the resins mentioned above are curable to a solid state by heating them to their curing temperature in the presence of a suitable polymerization catalyst. These catalysts can be added to the resin component of the finishing composition in an amount effective to properly cure the resin upon heating. Examples of such catalysts would include, for example when the resin is a phenolic resin, hexamethylenetetramine, formaldehyde, paraformaldehyde and acetaldehyde. When the resin is an epoxy resin, suitable catalysts would include, for example, dicyandiamide, triethanolamine borate, metaphenylenediamine and diphenylamine. When the resin is a polyester resin, examples of suitable catalysts would include, for example, benzoyl peroxide, lauroyl peroxide, methyl ethyl ketone, peroxide and tert-butyl-per-benzoate. When the resin is a polystyrene resin examples of suitable catalysts would include benzoyl peroxide, lauroyl peroxide, tertiary-butyl hydroperoxide, di-tertiary-butyl peroxide and tert-butylperbenzoate. Resins such as polystyrene, polysulphone and polyacrylics can be dried to harden the resin using only slightly elevated temperatures or can be air dried when highly volatile solvents-such as acetone are used as the evaporable liquid. The oils will dry to form a hardened film due to oxidation of unsaturated linkages, e.g., —CH CH—, or polymerization of the constituents. A complete description of drying type oils is given in Roger's Industrial Chemistry, Volume 2, Chapter 41, (1942), herein incorporated by reference.

Preferably, the coated filler particles of the finishing composition will be in slurry or paste form with an evaporable liquid carrier medium. The evaporable liquid can be water, alcohols such as methanol, ethanol, propanol, isopropanol and the like, ketones such as acetone, aromatic hydrocarbons such as xylene, toluene, benzene, solvent naphtha and the like, and the normally liquid organic solvent compounds of the N,N-dialkylcarboxylamide class such as dimethyl acetamide and the like. The specific gravity of the fluid finishing composition slurry must be between about 20° and 60° Baume at 25°C, and is preferably between about 20°–50° Baume when the solution is being applied to the interior bores of tubular support modules by a gravity casting bob technique or simple pouring technique. In paste form the finishing composition is between 60° and 80° Baume.

In the method of this invention, the finishing composition can be applied to a flat surface by pressing or brushing or the like; or to the inside of a tubular surface by pouring down the bore, force casting by gravity or applied pressure with a casting bob having a circular cross-section at its widest point, such as an iron ball, or the like; or if a very viscous paste is used, filling the tube end with the finishing composition and forcing it through the tube with a plunger, such as a piece of cloth or a metal ball attached to a metal wire, or the like. Any suitable technique can of course be used which will be effective to selectively fill the cavities and smooth the grain protrusions or protuberances sticking out from the support surface, without providing a thick coating that would fill an unduly large number of the pores in the support surface hampering pure water flux.

After the finishing composition has been applied to the support in the method of this invention, the evaporable liquid component, if one is used, can be removed by drying, preferably by heating the finishing composition on the support. If a flammable solvent is used as the evaporable liquid, the finishing composition can be heated by igniting it to burn off or remove the liquid and cure the resin to bond the finishing composition to the support surface. In another method, the evaporable liquid component can be removed by heating the support for example in an oven or press, at the curing temperature of the resin used, generally between about 140° to 275°C, for a short period of time, generally between about 5 to 90 minutes, effective to remove the liquid and to cure the resinous coating without causing degradation of the resin used as the binder in the support.

Prior to heating, the evaporable liquid can be partially removed by contact of the finishing composition surface with a stream of gas such as air or nitrogen. After heating to cure the resin, excess finishing composition granules can be removed by brushing. The brushing step provides an extra smooth membrane contact surface and provides increased porosity in the support walls. Any suitable technique can be used, such as using a fiber bristle brush having a diameter wider than the diameter of the bore.

A semipermeable membrane is then applied to the finished support, preferably by a casting in place technique from a membrane casting solution using standard techniques well known in the art, to provide a liquid purification apparatus comprising a supported semipermeable membrane. The cast membrane on the support may then be leached by contact with ice water or other suitable leaching solution and heated, as in hot water to increase the salt rejection of the membrane by decreasing the pore size.

EXAMPLE 1

A membrane support tube was made containing one axial hole. About 1,000 grams of washed dry sand, having an average particle size of about 105 microns (150 mesh), and about 9 grams of hexamethylenetetramine catalyst were mixed; then 56 grams of the reaction product of a phenol and an aldehyde, in solution, having a viscosity at 25°C of 4,200 cps. (sold commercially by Hooker Chemical Corporation under the Trade Name Durez Phenolic Resin), was added and the combination mixed until it was dry and free flowing.

The resin catalyst coated sand composition was poured into a 48 inch long cylindrical mold, which contained one axial rod symmetrically placed. Filling was performed on a vibrating table to facilitate packing and flow. The filled mold was then cured at atmospheric pressure for about 16 hours at 135°C to solidify the composition. The mold was then stripped, the central rod carefully removed and a strong rigid cast cylinder of resin coated sand particles containing one axial hole was obtained. It contained about 3.58 weight percent actual resin.

Inspection near the edge of the axial bore showed a rough wall surface containing protuberances and cavities which extended deeply into the module. Tubular, ultra thin 4 mil polyamide-imide reverse osmosis membranes were cast in place in the axial hole, which had a ½ inch inside diameter. A bullet type casting bob having a cylindrical cross-section at its widest point was used. The cylindrical module was placed in a stationary vertical position. The membrane casting solution was poured into the central bore and the bob was dropped through the bore, to form a film of polyamide-imide casting solution on the inside of each bore and to force the solution into the tube walls. Wall thickness of the tube was about ¾ inch.

During testing of the cylinder, tap water was fed into the membrane coated axial hole. After a while, the sand cylinder got damp, indicating that the ultra thin membrane had been punctured or not properly formed on the rough interior bore wall. Such a puncture or improper film formation would be extremely detrimental to salt rejection under reverse osmosis pressures of about 1500 psi.

A similar cast cylinder of phenolic resin coated 105 micron sand particles, containing a single one-half inch diameter bore was made. This cylinder also had a rough wall surface extending deeply into the module. The bore was filled with a finishing composition paste, having a specific gravity of about 80° Baume. The paste contained fine zirconia sand having an average particle size of between about 5–15 microns, coated with about 2–5 weight percent phenolic resin binder, based on dry sand coated weight, mixed with isopropanol (sold commercially under the Trade Name Ceramol 60 by Foseco Inc.). A piece of cloth was pushed through the bore with a wire to force the paste finishing composition into the bore cavities, smooth any bore grain protrusions and remove excess paste.

The cylinder was then placed in an oven at 200°C for about 30 minutes to evaporate the isopropanol solvent, dry and cure the phenolic resin coating the fine zirconia sand and bond the resin film on the zirconia to the resin film coating the coarse sand constituting the cast cylinder support. The excess zirconia facing was then brushed off by running a thick bristle brush several times through the interior cylinder bore. This helped thin the zirconia sand coating and exposed more of the coarse sand surface. Tubular 4 mil thick polyamide-imide reverse osmosis membranes were cast in the axial hole by the technique described above.

During testing the cylinder, tap water was fed into the membrane coated fine zirconia sand finished axial hole. The membrane was impervious to the passage of unpressurized water, indicating no punctures and good membrane file formation on the finished bore walls.

A third similar cast cylinder of phenolic resin coated 105 micron sand particles, containing a single ½ inch diameter bore was made. This cylinder also had a rough wall surface containing protuberances and cavities extending deeply into the module. The bore was filled with a finishing composition slurry, having a specific gravity of about 35°–45° Baume. The slurry contained fine zirconia sand having an average particle size of between about 5–15 microns, coated with about 2–5 weight percent phenolic resin binder, based on dry sand coated weight mixed with isopropanol (sold commercially under the Trade Name Ceramol 60 by Foseco, Inc.) further diluted with naphtha. The cylindrical module was placed in a stationary vertical position, the bore was stoppered on the bottom end and the slurry was poured into the bore until it was filled, the cast cylinder was then inverted to remove the finishing composition slurry. The solvent was partially removed by blowing a stream of nitrogen through the bore.

The cylinder was then placed in an oven at 200°C for about 30 minutes to evaporate the remaining solvent, dry and cure the phenolic resin coating the fine zirconia sand and bond the resin film on the zirconia to the resin film coating the coarse sand constituting the cast cylinder support. The excess zirconia facing was then brushed off by running a thick bristle brush several times through the interior cylinder bore. This helped thin the zirconia sand coating and exposed more of the coarse sand surface. Tubular 4 mil thick polyamide-imide reverse osmosis membranes were cast in the axial hole by the techique described above.

During testing the cylinder, tap water was fed into the membrane coated fine zirconia sand finished axial hole. The membrane was impervious to the passage of unpressurized water indicating no punctures and good membrane film formation on the finished bore walls.

EXAMPLE 2

Five flat ¼ inch thick membrane support discs, having 2 inch diameters were made. They had the same composition as the membrane support tubes made in EXAMPLE 1, using phenolic resin bonded sand having a 105 micron average particle size. Visual inspection showed a variety of irregularities such as cavities and protruding sand grains on all of the discs. These irregularities were very similar to those found on the rough surface of the bore walls in the cylinders of EXAMPLE 1.

A flat 4 mil thick polyamide-imide reverse osmosis membrane was cast on one of the sand discs using standard doctor blade casting techniques. This supported membrane was mounted in a standard stainless steel reverse osmosis test cell. The test cell had a feedwater side sealed with a rubber O-ring. The product side of the test cell consisted of a fine stainless steel wire cloth covered by two layers of paper on which the membrane coated sand disc was placed, with the membrane side facing the feed liquid opening which was angled to distribute the feed liquid against and across the membrane. A 3.5 wt percent concentrated NaCl solution was fed into the reverse osmosis cell against and contacting the membrane at 1500 psi and 25°C. The membrane on the unfinished sand disc gave only about 2 percent salt rejection at these high operating pressures.

Three of the other sand discs were coated with a finishing composition slurry, having a specific gravity of about 45°–50° Baume. The slurry contained fine zirconia sand having an average particle size of between about 5–15 microns, coated with about 2–5 weight percent phenolic resin binder based on dry sand coated weight, mixed with isopropanol. The slurry of the finishing composition was applied by brushing on the disc with a bristle brush.

The finishing composition was then ignited with a match to burn off the solvent, cure the phenolic resin coating the fine zirconia sand and bond the resin film on the zirconia to the resin film coating the coarse sand constituting the sand disc support.

The excess facing was brushed off with a stiff bristle brush to provide a smoothed surface on the three sand discs. Most of the coarse sand support wall could be seen. The disc cavities were filled with the finishing composition. The finishing composition was well bonded to the support disc and the fine zirconia sand in the cavities in one of the discs was removed only by digging the sharp end of a metal file into the individual cavities.

A flat 2–3 mil thick polyamide-imide reverse osmosis membrane was cast on one of the other finished sand discs by standard doctor blade casting technique. This supported membrane was mounted in the standard stainless steel test cell described above. A 3.5 wt percent concentrated NaCl solution was fed into the reverse osmosis cell against and contacting the membrane at 1500 psi and 25°C. The membrane gave 35 percent salt refection and a pure water flux of 30 gal/sq.ft.-day. This indicated excellent film formation and little or no membrane puncture.

Similarly, a 4 mil thick polyamide-imide reverse osmosis membrane was cast on another of the finished sand discs and a 3.5 wt percent NaCl solution used at 1500 psi. The membrane gave 75 percent salt rejection at 0.1 gal/sq.ft.-day pure water flux and is an even better indication that there was no membrane puncturing.

The last sand disc was coated with a dry finishing composition mixture of sand having an average particle size of between about 20–30 microns coated with about 6–8 weight percent phenolic resin binder. A thin coat was spread on the sand disc and pressed in place with a spatula.

The disc was then placed in a press having polished steel plates and heated to about 150°C at 100 psi for about 10 minutes to harden and cure the phenolic resin coating the sand and bond the sand resin film to the resin film coating the coarse sand constituting the cast cylinder support.

A flat 2–3 mil thick polyamide-imide reverse osmosis membrane was cast on the finished sand disc by standard doctor blade casting techniques. This supported membrane was mounted in the standard stainless steel test cell described above. A 3.5 wt percent NaCl solution was fed into the reverse osmosis cell against and contacting the membrane at 1500 psi and 25°C. The membrane gave 25 percent salt rejection and a pure water flux of about 5 gal/sq.ft.-day. This indicated excellent film formation and little or no membrane puncture.

This method of finishing the surface of reverse osmosis apparatus containing a bonded filter particle type support is seen as applicable for all type semipermeable membranes although it is a critical step in those sytems employing ultra thin membranes of about 0.08–6 mils thickness.

We claim:

1. A method of making a liquid purification module comprising a supported semipermeable membrane comprising the steps of:
   A. providing an open sore support module made of bonded, resin-coated filler particles having a granular structure and an average particle size between about 40 and 500 microns, the resin coating constituting about 1 to 18 percent of the coated filler particle weight, the module having at least one feed bore extending from end to end therethrough;
   B. applying a thin coating of a finishing composition to the entire surface of the interior feed bore walls, said finishing composition comprising filler particles coated with a resinous material and having a granular structure and an average particle size between about 0.5 and 30 microns, the resinous material constituting about 0.5 to 10 percent of the coated filler particle weight;
   C. drying the finishing composition coating to form a porous coating bonded to the bore walls; and finally
   D. applying a polymeric semipermeable membrane to the interior finished bore walls to provide a porous liquid purification module.

2. A method of making a liquid purification module comprising a supported semipermeable membrane comprising the steps of:
   A. providng an open pore support module made of bonded, resin-coated filler particles having a granular structure and an average particle size between about 40 and 500 microns, the resin coating constituting about 1 to 18 percent of the coated filler particle weight, the module having a plurality of spaced-apart feed bores extending from end to end therethrough, said feed bores having walls with protrusions and cavities;
   B. applying a thin coating of a fluid finishing composition having a specific gravity between about 20° – 60° Baume to the entire surface of the interior feed bore walls, to fill the wall cavities and smooth the wall protrusions, said finishing composition comprising filler particles coated with a resinous material and having a granular structure and an average particle size between about 0.5 and 30 microns, the resinous material comprising about 0.5 to 10 percent of the coated filler particle weight, said coated filler particles being mixed with an evaporable liquid; and then
   C. drying the finishing composition coating to evaporate the liquid, form a liquid permeable coating, harden the finishing composition resinous material and bond the finishing composition resinous material to the resin-coated filler particles of the open pore support module bore walls; and then
   D. removing excess finishing composition to provide smooth open pore feed bore walls; and then
   E. applying a polymeric semipermeable membrane to the interior finished feed bore walls to provide a porous liquid purification module.

3. The method of claim 2 wherein the fluid finishing composition is placed into each of the bores within the module and forced through the bores in step (B).

4. The method of claim 2 wherein the fluid finishing composition is poured down the bore in step (B).

5. The method of claim 2 wherein the finishing composition is heated between about 140°–275°C in step (C).

6. The method of claim 5, wherein after step (B) and before heating in step (C), the evaporable liquid is partly removed by contacting the finishing composition surface with a stream of gas.

7. The method of claim 5 wherein the resinous material used in the finishing composition is selected from the group consisting of phenolic resins, epoxy resins, polyester resins, polystyrene resins, poly-imide resins, polyamide-imide resins, polysulphone resins, polyacrylic resins and natural drying oils and the evaporable liquid used in the finishing composition is selected from the group consisting of water, alcohol, ketone, aromatic hydrocarbons and liquid N, N-dialkylcarboxylamide compounds.

8. The method of claim 7 wherein the finishing composition resinous material is a resin and also contains a small effective amount of polymerization catalyst and is heated in step (C) for about 5 to 90 minutes.

9. The method of claim 7 wherein the applied membrane is about 0.08–6 mils thick, the finishing composition has a specific gravity of between about 20°–50° Baume and the resin coating the filler particles of the finishing composition comprises about 0.5–5 weight of the coated filler particle weight.

10. The method of claim 7 wherein the open pore support module and finishing composition is made of sand particles coated with a resin selected from the group consisting of epoxy and phenolic resin, the membrane is applied to the feed bore walls by casting a resin solution in - place to form a membrane of about 0.08–15 mils thick, and the resin of the membrane casting solution is selected from the group consisting of cellulose esters, cellulose ethers, polyamides, polyamide-imides, polyphenylesters, polypyrrones, polyacrylics, and polysulfonamides.

11. The method of claim 10 wherein the membrane is cellulose acetate and as a last step the membrane is leached by contacting it with a leaching solution.

* * * * *